TRANSPORTATION AND STORAGE HOPPER

Filed Nov. 22, 1954 5 Sheets-Sheet 1

INVENTOR
HAMILTON NEIL KING PATON
BY
Fetherstonhaugh & Co.
ATTORNEYS

TRANSPORTATION AND STORAGE HOPPER

Filed Nov. 22, 1954 5 Sheets-Sheet 2

INVENTOR
HAMILTON NEIL KING PATON
BY
Fetherstonhaugh & Co.
ATTORNEYS

April 8, 1958 H. N. K. PATON 2,829,803

TRANSPORTATION AND STORAGE HOPPER

Filed Nov. 22, 1954 5 Sheets-Sheet 3

INVENTOR
HAMILTON NEIL KING PATON
BY
Fetherstonhaugh & Co.
ATTORNEYS

April 8, 1958 H. N. K. PATON 2,829,803

TRANSPORTATION AND STORAGE HOPPER

Filed Nov. 22, 1954 5 Sheets-Sheet 4

INVENTOR
HAMILTON NEIL KING PATON
BY
Fetherstonhaugh & Co.
ATTORNEYS

April 8, 1958 H. N. K. PATON 2,829,803

TRANSPORTATION AND STORAGE HOPPER

Filed Nov. 22, 1954 5 Sheets-Sheet 5

INVENTOR
HAMILTON NEIL KING PATON
BY
Fetherstonhaugh & Co.
ATTORNEYS 2,829,803

TRANSPORTATION AND STORAGE HOPPER

Hamilton N. K. Paton, Vancouver, British Columbia, Canada, assignor to Paton Holdings Ltd., Vancouver, British Columbia, Canada Application November 22, 1954, Serial No. 470,403

27 Claims. (Cl. 222—95)

Figure 1:
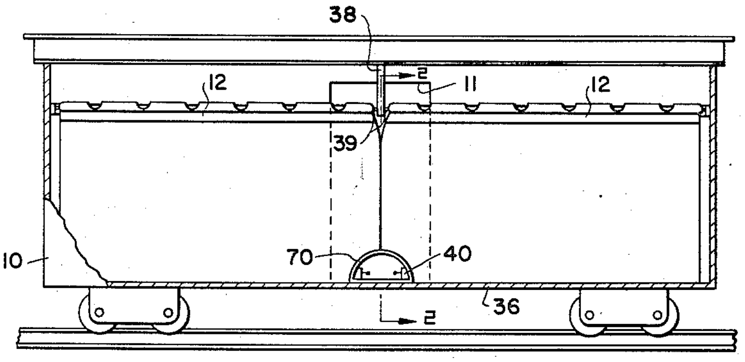

This invention relates to a hopper which may be used for transporting and/or storing granular or powdery materials, such as flour, grain, and the like.

The main object of the present invention is the provision of a hopper which may be used for transporting or storing material, and which is collapsible and may be quickly and easily folded up for storage or shipment.

Another object is the provision of a hopper normally having a substantially flat bottom which may be moved to form a sloping bottom for discharging purposes.

Another object is the provision of a hopper having a substantially flat bottom and including means for tilting the latter when it is desired to discharge the contents thereof.

A still further object is the provision of a hopper having a bottom designed automatically to tilt as material is being sucked out of the hopper.

Yet another object is the provision of a hopper including means which pneumatically aids in discharging material therefrom.

A still further object is the provision of a collapsible hopper utilizing the maximum amount of space available for holding material, and which may be collapsed into a small bundle for storage or shipment after it is unloaded.

Yet another object is the provision of a transportation or storage hopper including means by which material therein may be fluidized to assist in the unloading operation.

This hopper is primarily intended to be made in collapsible form in order that it may be collapsed and folded up for shipment or storage. For this purpose, it is desirable to make the hopper in the form of a flexible container or bag. It is necessary to provide some form of support for the hopper when made in this manner. The support, may be in the form of a special supporting framework which itself is stationary or portable, or it may be the walls of a storage space or of a freight car. Furthermore, the hopper may be made self-supporting, in which case it would have at least one flexible side and a bottom connected thereto, at least a portion of which is free to be raised. For example, the hopper may have a solid top, a solid wall, a flexible wall opposed to the solid wall, flexible end walls, and a bottom which may be completely or partially flexible.

The container described herein is a flexible one, and for the sake of convenience it is shown in a railroad freight car. The hopper is particularly designed for fluid materials, such as powders, flour, grains, sugar, cement, and the like.

One form of transportation and storage hopper according to this invention comprises a closed container having a flexible side and a bottom connected thereto at least a portion of which is free to be raised, a discharge opening along said bottom portion spaced from the flexible wall, and means for changing the relative pressure of the air in the container and that on the outer surface of the flexible wall to cause inward movement of the latter to raise said bottom portion, whereby fluid material in the container is directed to the discharge opening. The means for changing the relative pressure of the air in the container and that on the outer surface of the flexible wall may be means within the container through which the contents of the latter may be sucked out of it, and/or a pressure pocket overlapping the flexible wall with means for admitting gas under pressure to the pocket, said pressure pocket may extend under the free portion of the bottom of the hopper or a separate pressure pocket may be provided under this portion. The pressure pocket or pockets may be used even when the materail is discharged directly through an opening in the bottom of the hopper.

In place of the means for changing the relative pressure of the air as referred to above, the container may have a discharge opening in the bottom thereof along the portion of the bottom which is free to rise and spaced from the flexible wall, and means may be provided outside the hopper for tilting the free portion of the bottom towards the discharge opening. Another variation of the invention is to provide a trough below the discharge opening in which conveying means, such as a worm or belt, is mounted.

Figure 2:
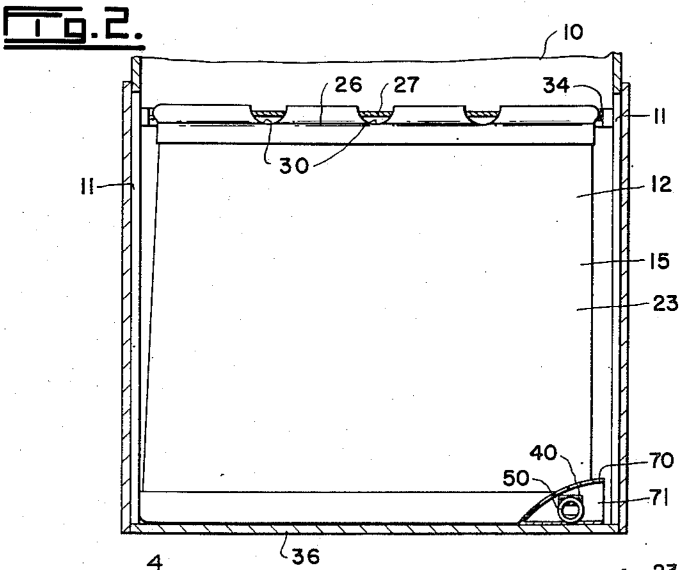
Figures 3, 4:
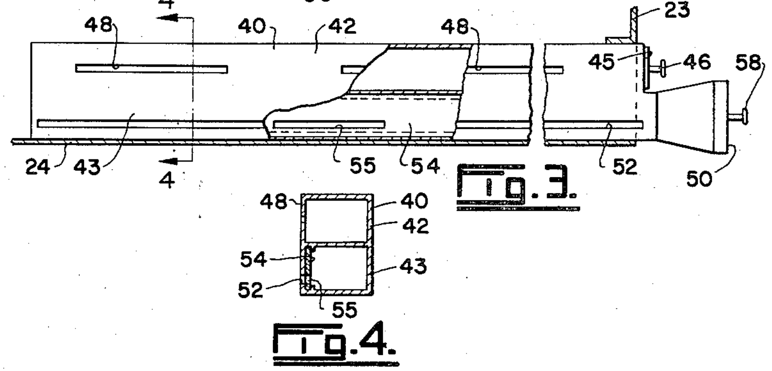
Figures 5, 6:
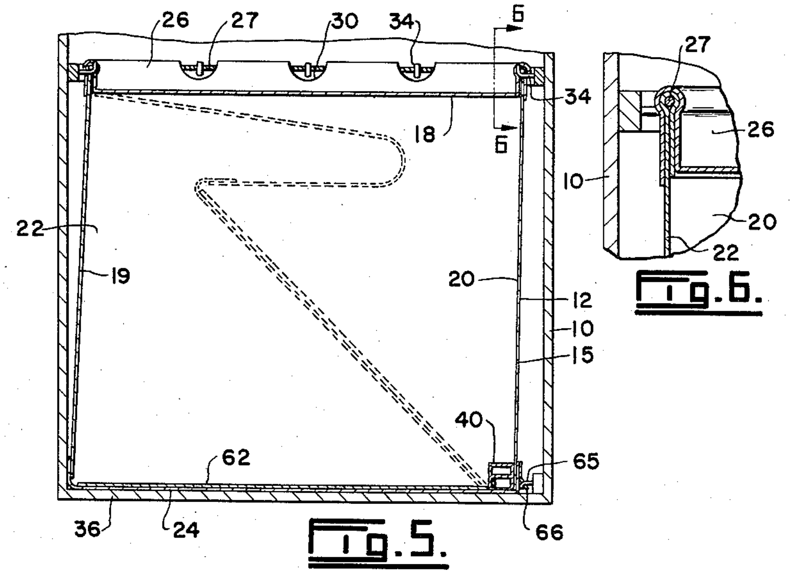
Figure 7:
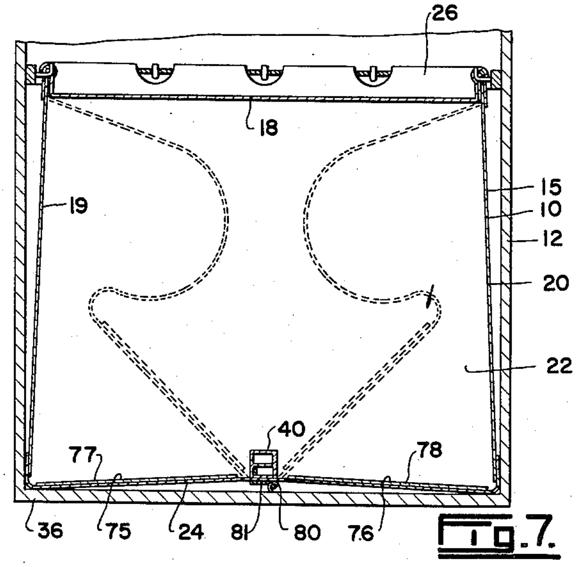
Figure 8:
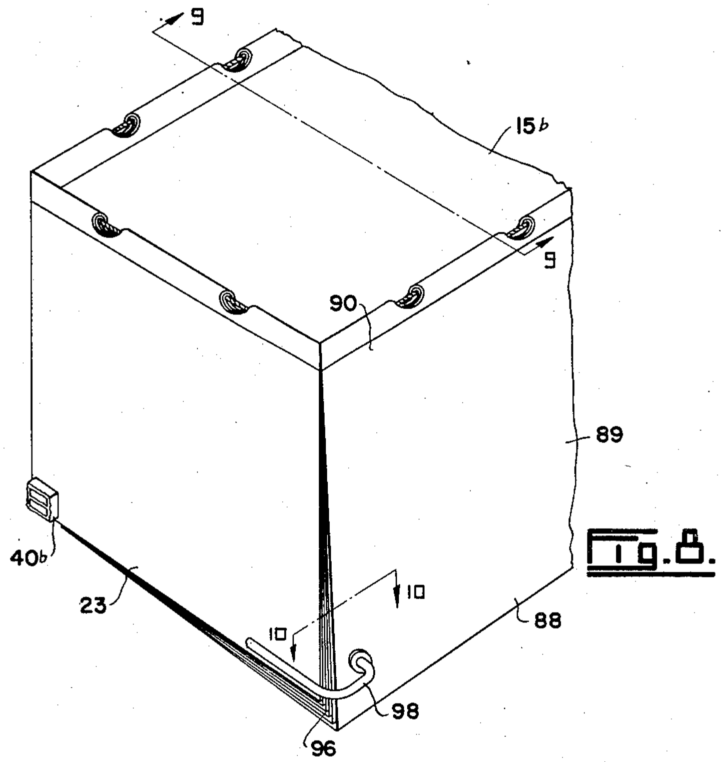
Figures 9, 10:
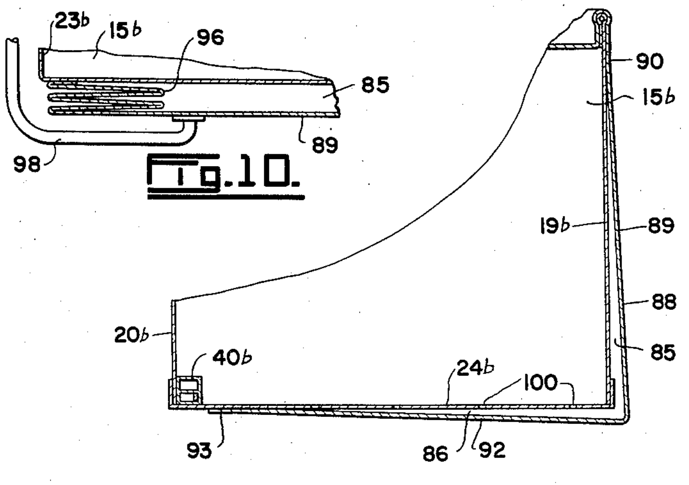
Figures 11, 12, 13, 14:
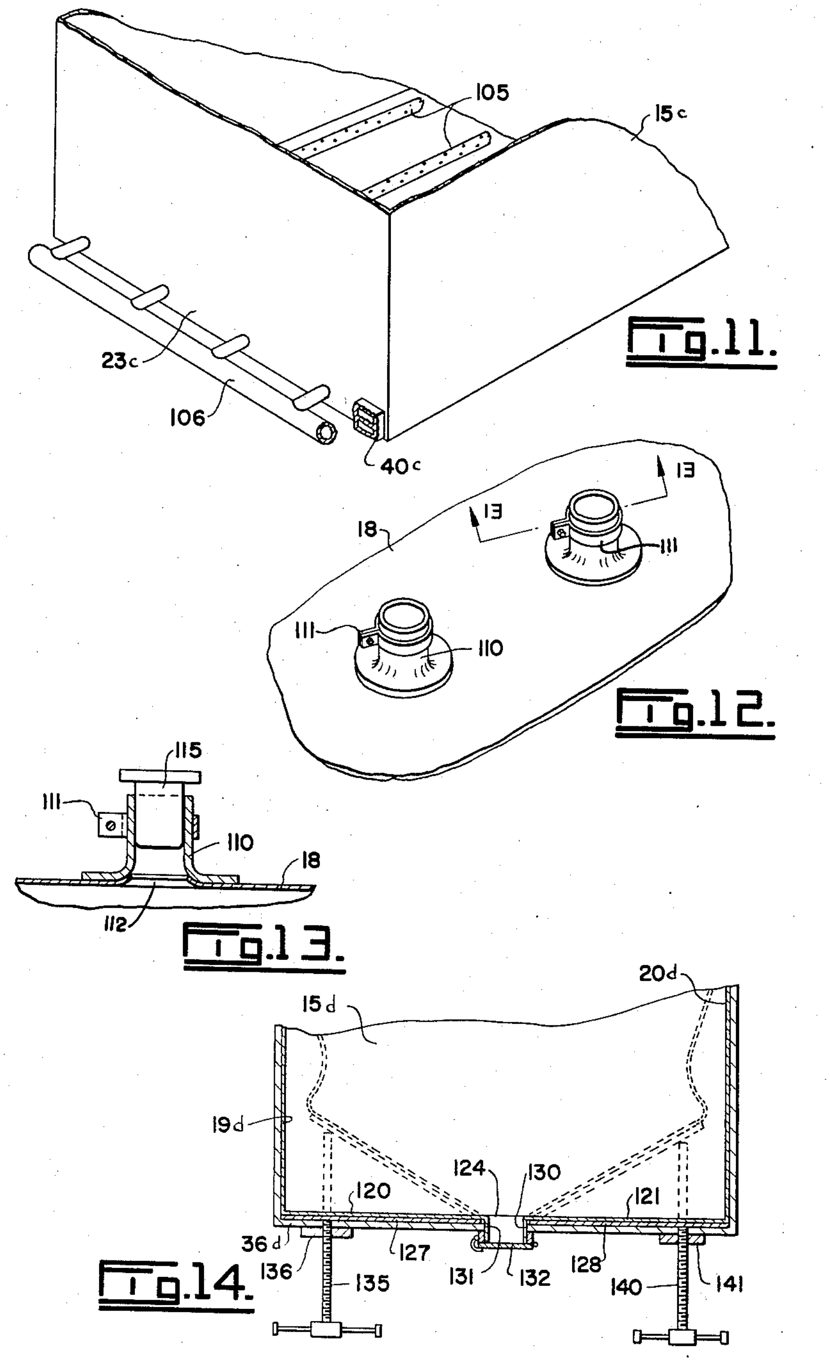
Figure 15:
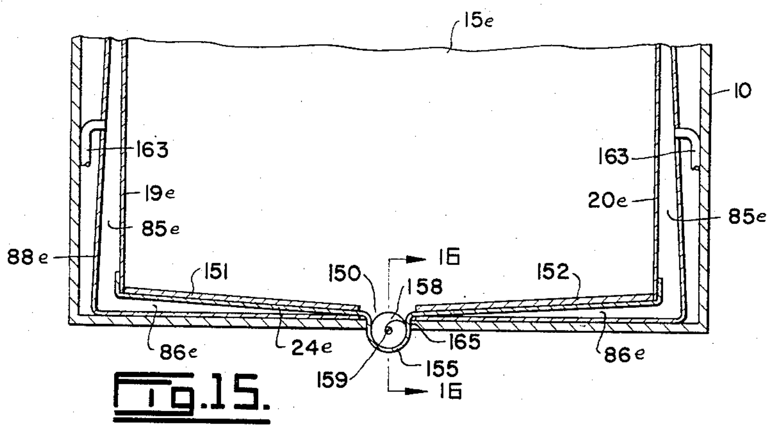
Figure 16:
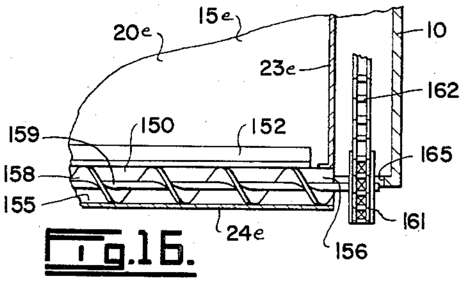
Figure 17:
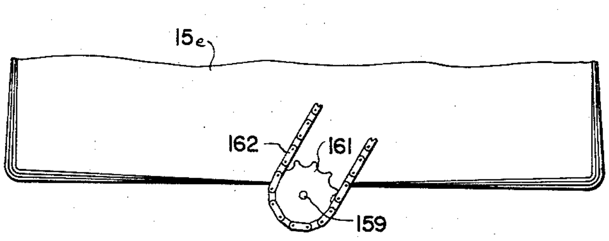

Examples of the invention are illustrated in the accompanying drawings, in which, Figure 1 is a side elevation of a freight car with the near wall broken away and diagrammatically showing two transportation and storage hoppers set up therein, Figure 2 is an enlarged vertical section taken on the line 2—2 of Figure 1, showing a hopper in end elevation, Figure 3 is a side elevation of a discharge suction tube, partly in section, to be used in the hopper, Figure 4 is a vertical section taken on the line 4—4 of Figure 3, Figure 5 is a vertical cross section taken through one form of hopper, Figure 6 is an enlarged sectional detail taken on the line 6—6 of Figure 5, Figure 7 is a view similar to Figure 5 through another form of hopper, Figure 8 is a perspective view of one end of a hopper container illustrating a pressure pocket arrangement which may be used with either of the hoppers of Figures 5 and 7, Figure 9 is a vertical section taken on the line 9—9 of Figure 8, Figure 10 is an enlarged detail section taken on the line 10—10 of Figure 8, Figure 11 is a fragmentary perspective view of a hopper container including means for fluidizing material therein, Figure 12 is a perspective view of a portion of a top of a hopper illustrating one form of entrance through which the container may be filled, Figure 13 is a vertical section taken on the line 13—13 of Figure 12, Figure 14 is a vertical cross section through the lower part of a hopper container, showing mechanical means for tilting the bottom thereof towards a central discharge opening, Figure 15 is a cross section through another form of hopper having mechanical discharge means beneath the discharge opening thereof, Figure 16 is a fragmentary vertical section taken on the line 16—16 of Figure 15, and Figure 17 is an end elevation of the hopper of Figures 15 and 16 showing a device for the mechanical discharge means.

Referring to Figure 1 of the drawings, 10 is a freight car having an entrance 11 in each side thereof. One or more transportation or storage hoppers may be positioned or mounted in this car. In this illustration, there are two hoppers 12 in the car. These hoppers extend from the ends of the car towards the centre thereof. If desired, a space may be left between these hoppers, or some form of partition, not shown, may be inserted between them. For the sake of clarity, the hoppers have been shown in the drawings spaced from the walls of the car, but it will be understood that when the hoppers are filled, the walls thereof will bear against the car walls so that the latter prevent the hopper walls from bursting.

Each hopper 12 preferably comprises a flexible container 15 which usually is formed of strong thin material which is moisture proof and impervious to air. The container may be formed in any desired manner. The illustrated container is formed with a top 18, side walls 19 and 20, end walls 22 and 23, and a bottom 24. These are all formed of the flexible material. As this container cannot support itself, the top and side and end walls may be secured to each other in such a way as to form a peripheral flange 26 extending around the top of the container and projecting upwardly therefrom. A rope or cable 27 may be threaded through this flange, and the latter may be provided with a plurality of spaced recesses 30 in its upper end, at each of which the rope or cable is exposed.

The freight car is provided with a plurality of hooks 34 along its side and end walls spaced above the bottom of the car over which the rope or cable 30 may be placed so that the container is supported around its top by these hooks. The bottom of the container usually rests on the bottom 36 of the car. Figures 1, 2 and 5 show how the hopper container is hung in the freight car.

Referring to Figure 1, if it is desired to support the upper edges of the adjacent ends of the hoppers 12, a suitable supporting member 38 may depend from the ceiling of the car, said member being provided with hooks 39 over which the ropes 30 of the containers may be placed.

The hopper containers 15 of Figures 2 and 5 are intended to be emptied by suction means. For this purpose, the discharge suction tube 40 is provided within the container and extends the length thereof on its bottom 24 with one end projecting through the end wall 23. Any desired form of suction tube may be used for this purpose, as long as it has a discharge opening therein through which material may be sucked from the container. In this example, the tube 40 has upper and lower sections 42 and 43. The upper section has an air inlet 45 at one end outside the container which may, if desired, be provided with an air control 46. One or more of the inlet slots 48 are formed in the upper section and open into the hopper container. The lower section 43 has an entrance 50 which is preferably circular in cross section so that the end of a suction hose may be connected to it. The lower section is provided with one or more outlet slots or discharge openings 52 communicating with the interior of the bag. If desired, there may be one slot or opening 52 extending substantially the full length of each side of the lower section. If necessary, a slide 54 may be provided within section 43 overlapping each slot or opening 52, said slide having a plurality of aligned and spaced slots 55 therein registering with the continuous slot or opening 52. In this example, there are a plurality of aligned spaced slots 48 in the upper section 42, and the slide 54 may be adjusted longitudinally of the suction tube to shift the effective outlet or discharge slots of the lower section relative to the inlet slots of the upper section. For this purpose, a handle 58 may be connected to one end of the slide, said handle projecting outwardly through the entrance 50. In this case, the slide would have to be adjusted before a suction hose is connected to said entrance.

In Figures 1, 2 and 5, the suction discharge tube 40 rests on the container bottom 24 along the lower edge of wall 12. In other words, it is spaced substantially the entire width of the container from the flexible wall 19. The bottom of the container may be left in the flexible state, but it is believed that better results are obtained by making the portion of the bottom from the suction tube to the flexible wall 19 relatively stiff. This may be done by using a stiff material for the bottom portion or providing a stiff bottom member 62 either inside or outside the container and connected to the bottom 24 thereof in any suitable manner, such as by means of glue. The stiff member 62 extends from the suction tube to the opposite side wall of the container. In effect, the bottom of this container is stiff, but it is free to rise since it is more or less hinged along the side of the suction tube, the portion of the flexible bottom 24 of the container along the tube forming the hinge.

As it is desirable to prevent the lower longitudinal corner formed by wall 20 and bottom 24 of the container from rising, suitable means is provided in the freight car for this purpose. This may be done by means of a plurality of hooks 65 along the adjacent side wall of the car near the bottom thereof, said hooks fitting into suitable holes in a flap 66 secured to the wall 20 of the container near its bottom, see Figure 5.

Referring again to Figure 1, it will be seen that the outer ends of the discharge tubes 40 of the two hoppers 12 are opposite each other and in line with the doors 11 of the freight car. In order to empty the hoppers, it is necessary to connect suction equipment to these outer ends. In order to provide sufficient space for this purpose, the suction tubes may be made a little shorter than the containers, although they project through the adjacent ends 23 thereof. As the containers are to be filled with a fluid material, it is desirable to provide a housing 70 adapted to fit beneath the containers at the adjacent lower corners thereof which are opposite a door of the freight car. This container opens outwardly at 71, see Figure 2. The outer end or entrance 50 of each suction tube projects into this housing. Thus, the housing takes the weight of the material in the portions of the containers resting on it, and it provides a space in which suction equipment may be connected to either or both of the tubes.

The container 15 may be filled or nearly filled with a fluid material, such as, for example, flour. The side walls and bottom of the freight car actually support the material, while the container provides an air-impervious bag around it. When it is desired to empty the bag, suitable suction equipment, not shown, is connected to the entrance 50 of the suction discharge tube. When the suction equipment operates, the material is drawn through the discharge outlet 52 into the lower section 43 of the tube, whence it is drawn out by the suction equipment. As this takes place, a limited amount of air enters the upper section 42 of the tube and passes into the container through slots 48. The amount of air admitted may be regulated by control 46.

As the suction continues, an area of low pressure is formed in the container, but for some time the weight of the material therein keeps the bottom 24 against the bottom of the car. At this time the flexible side 19 tends to be drawn inwardly of the container. As the load on the container bottom lessens, the container side continues to move inwardly and starts to lift the edge of the bottom connected thereto. In other words, it tilts the bottom towards the discharge opening of the suction tube, as shown in broken lines in Figure 2. In this way, all the material may be drawn out of the bag. The advantage of this will readily be seen since the container is rectangular in cross section and, therefore, practically fills the cross sectional area of the freight car. However, without this tilting idea, it would be practically impossible to get all the material out of the container by the suction means. By leaving the end walls, wall 19 and the bottom of the container free to move inwardly, the container gradually assumes a hopper form as the material is sucked out of it. While this is taking place, the top of the container cannot move downwardly and the side 20 thereof cannot move inwardly to any great extent.

The form of the invention illustrated in Figure 7 is only slightly different from that of Figures 2 and 5. In this case, the suction discharge tube 40 extends longitudinally of the container 15 substantially midway between its opposite side walls 19 and 20, both of which are flexible. The bottom 24*a* of this container is divided by the suction tube into sections 75 and 76 which extend outwardly from the tube and are connected to the lower edges of walls 19 and 20, respectively. These sections may be flexible, or they may be made relatively stiff by stiff members 77 and 78 secured thereto along their inner or outer surfaces. Each stiff member extends from a point adjacent the tube to the outer edge of its bottom section. If desired, a plurality of hooks 80 may be provided along the bottom 36 of the freight car, and a flap 81 may be secured to the bottom 24*a* of the container immediately beneath the tube, this flap being provided with a plurality of holes for receiving the hooks.

The alternative of Figure 7 operates much in the same manner as that of Figures 2 and 5. The main difference is that as the suction equipment draws the material from the container into discharge openings in the suction tube and then out of the hopper, the low pressure area formed within the container results in its flexible walls 19 and 20 being drawn inwardly. As the load in the container lessens, this results in the outer edges of the bottom portions 75 and 76 being raised so that said sections are tilted towards the discharge openings of the tube to direct the material thereon towards said openings. As both side walls of the container are drawn inwardly by the suction action, it is not usually necessary to hold the center of the bottom down, but hooks 80 may be used for this purpose, if desired.

Figures 8 to 10 illustrate a hopper container 15*b* having a suction discharge tube 40*b* extending along the bottom at one side thereof and projecting outwardly from the end 34*b* of the container. This container is formed in the same manner as that of Figures 2 and 5. The container is provided with a pressure pocket 85 overlapping the flexible side 19*b*, and another pressure pocket 86 overlapping the container bottom 24*b*. In this example, the pockets 85 and 86 are actually one, and they are formed by a strip of flexible gas-impervious material 88 having a portion 89 extending over the entire wall 19*b* and secured to the upper edge thereof at 90, and another portion 92 extending over most of the bottom 24*b* and secured thereto at 93 adjacent the suction tube 40*b*. Each of the opposite ends of the material strip 88 are connected by a bellows wall 96 to the adjacent ends of the container wall and bottom. This bellows wall permits the bottom 24*b* to rise and the flexible wall 19*b* to move inwardly relative to the strip 88. The container bottom may be formed with a stiffening member, if desired, although this is not shown in Figure 9. A small tube 98 is provided for directing air or any other gas under pressure into the pockets 85 and 86.

This alternative may be provided with means for fluidizing the material in container 15*b*. This may be done in numerous ways, one of which is illustrated in Figure 9. A plurality of small holes 100 may be formed in and thoughout the container bottom 24*b*. These holes are designed to permit a limited amount of air to flow from pocket 86 into the container.

When it is desired to unload container 15*b*, suction equipment may be connected to the tube 40*b* to suck the material out of the container as described above. While this is being done, air under pressure may be pumped from a suitable source, not shown, through tube 98 into pockets 85 and 86. It is obvious that the air may be pumped into the pockets during the unloading operation, or it may be pumped into them immediately after the bag has been loaded. In the latter case, it would not be practical to include the holes 100 in the bottom of the container. In either case, during unloading, the relative pressure of the air in the container and that on the outer surface of the flexible wall 19*b* and the bottom 24*b* is changed so that said wall and bottom are moved inwardly of the container. This lifts or tilts the bottom so that the material thereon is directed towards the discharge tube. If the holes 100 are provided in the container bottom, the air or gas is directed into the material within the container as it is unloaded in order to fluidize the material, thus making it easier to suck it out of the container.

It is obvious that either of the pressure pockets 85 or 86 may be omitted, and that pressure pockets may be provided along the outer surfaces of both walls 19 and 20 and/or bottom sections 75 and 76 of container 15 in Figure 7. Furthermore, the containers with which the pressure pockets are used may have discharge openings directly in the bottoms thereof in place of the suction tubes. These discharge openings would be located in the same positions as the tubes, and they would be normally closed by suitable closures. When the latter are opened, a certain amount of material would run out of the containers, and the air in the air pockets would then cause the container bottoms to tilt towards the discharge openings.

Figure 11 shows a hopper container 15*c* having a different arrangement for fluidizing the material therein during the discharge thereof. This hopper has a plurality of perforated tubes 105 extending along the bottom thereof and out through its end 23*c*. These tubes are connected to a common header 106 which is adapted to be connected to a suitable source of air or gas pressure. With this arrangement, air or gas may be pumped into the container through the tubes 105 in order to fluidize the material in said container while it is being sucked out through the suction tube 40*c* of the container. The tubes preferably are flexible and they may be made of the same material as the container and secured to the bottom of the latter.

The material may be directed into the hopper containers of this invention in any desired or convenient manner. Figures 12 and 13 show part of the top 18 of the previously-described containers. The top is provided with one or more upwardly projecting flexible necks 110 having clamps 111 extending therearound. Each neck opens into the interior of the container as indicated at 112 in Figure 13. The necks 110 may normally have plugs 115 therein which are held in place by the clamps 111. When it is desired to fill the container, the plugs are removed and tubes, not shown, may be inserted therein and held in place by clamps 111, said tubes being adapted to direct the material into the container. If desired, one of the necks may be left open to permit air to escape from the container during loading. Furthermore, a suitable filter (not shown) may be provided for the neck that is left open in order to remove particles from the air being discharged from the container.

Figure 14 illustrates a very simple form of the invention. This alternative includes a container 15*d* having flexible side walls 19*d* and 20*d*, and bottom sections 120 and 121 extending inwardly from the lower edges of said side walls. These bottom sections extend inwardly to a discharge opening 124 extending longitudinally of the container centrally thereof. If desired, the sections 120 and 121 may be provided with stiffening members 127 and 128. The discharge opening is provided with a downwardly-extending collar 130 adapted to extend through a slot 131 formed in the bottom 36*d* of the freight car. A suitable closure 132 is provided for the discharge opening. This closure is normally clamped in the closed position.

Suitable mechanical means is provided for tipping the bottom sections 120 and 121 towards the discharge opening 124. In this example, one or more screw shafts 135 are threaded through bearing blocks 136 mounted on the bottom 36*d* of the car, said shafts extending through said bottom and bearing against the underside of the container bottom section 120 near the outer edge thereof. Similarly, one or more screw shafts 140 are threaded through bearings 141 carried by the car bottom 36*d* and extending through the latter to bear against the container bottom section 121 near its outer edge. The illustrated screw shafts are turned manually, but it is obvious that a suitable power drive might be connected to them.

In order to discharge container 15*d*, the closure 132 is opened to allow the material of the container to run out through the discharge opening 124. During this process, the screw shafts 135 and 140 are turned to raise the outer portions of the container bottom sections 120 and 121 to tilt said sections towards the discharge opening, as shown in broken lines in Figure 14. Container 15*d* fills the full cross sectional area of the freight car, and yet it may be moved into hopper formation during discharge. It is obvious that the discharge opening may be located at one side of the container bottom, but this would not be as satisfactory as the central opening described above.

Figures 15 to 17 illustrate a form of hopper having its own discharge conveyor mounted immediately beneath the discharge opening thereof. The bottom of the hopper container may be tilted towards the discharge opening by mechanical means, as in Figure 14, or by one or more pressure pockets, as in Figures 8 to 10. Figures 15 to 17 illustrate the latter form of tilting arrangement. Furthermore, the discharge opening has been shown in this example centrally of the hopper container, but it is obvious that it may be located at either side of the hopper bottom.

The hopper container 15*e* has a discharge opening 150 in and extending longitudinally of its bottom 24*e*. If desired, the bottom may be provided with stiffening members 151 and 152 on opposite sides of the opening and extending to the flexible side walls 19*e* and 20*e*, although these are not absolutely necessary. A substantially U-shaped trough 155 extends along the bottom of the container beneath the discharge opening 150. In this example, the trough is formed of the same material as and integral with the bottom 24*e*. This trough opens out at 156 beneath the container end 23*e*, see Figure 16. Suitable conveying means is located in this trough. This conveying means may be a screw conveyor 158 rotatably mounted in and extending longitudinally of the trough. This conveyor has a shaft 159 projecting out through the trough opening or discharge outlet 156. Suitable drive means is mounted on the outer end of this shaft, such as a sprocket 161, which may be turned by suitable source of power, not shown, through a chain 162. Other conveying means may be employed in the trough 155, such as an endless belt arrangement. In any case, when it is desired to unload the hopper container, the conveying means is operated to discharge material through the outlet 156 of the trough. The discharged material may be picked up by some other conveyor, or it may be directed into a storage bin or some form of conveyance, or it may be moved by suction to any desired point.

A pressure pocket 85*e* may be provided along the outer surface of the container walls 19*e* and 20*e*, and/or pockets 86*e* may be provided along the portions of the container bottom 24*e* on each side of the discharge opening 150. In this example, strips of gas-impervious material 88*e* extend over the outer surfaces of the side walls and the portions of the bottom of the container. Bellows walls, not shown, connect the opposite ends of the strips 88*e* to the adjacent ends of the container walls and bottom, in the manner illustrated in Figures 8 to 10. Air or gas may be directed into the pockets 85*e* and 86*e* through suitable hoses 163.

The container 15*e* is shown mounted in a freight car 10. The trough 155 may be completely within the car or it may fit down through a slot 165 in the car bottom, as shown in Figure 15. This allows the bottom of the container to lie flat on the car bottom.

When it is desired to unload the hopper container 15*e*, a suitable source of power is connected to chain 162 to rotate the discharge screw 158. The material of the hopper moves downwardly through the discharge opening 150 thereof and is directed along the trough 155 by the screw conveyor. This material is discharged through the outlet 156. When necessary, air may be directed into the pressure pockets 85*e* and 86*e* to move the container side walls 19*e* and 20*e* inwardly. This action, along with the effect of the pressure in pockets 86*e* if, the latter are used, tilts the bottom of the container towards the discharge opening thereof, thus directing all the material in the hopper to said opening. If necessary, fluidizing means, such as illustrated in Figure 9 or Figure 11, may be used in this container.

As stated above, suitable mechanical means may be provided for tilting the bottom portions of the container instead of the pressure pockets shown in Figures 15 to 17.

Although the invention has been described and illustrated in connection with elongated containers it is obvious that the containers may be any substantially rectangular shape. Furthermore, the terms "side" and "end" walls have been used only for convenience, and these terms are interchangeable.

What I claim as my invention is:

1. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said bottom portion spaced from the flexible wall, means for changing the relative pressure of the air in the container and that on the outer surface of the flexible wall to cause inward movement of the latter to raise said bottom portion, and means for preventing the bottom portion at the opening from rising with the remainder of said portion, whereby fluid material in the container is directed to the discharge opening.

2. A transportation and storage hopper for fluid materials comprising a closed container having a flexible side wall and flexible end walls, said flexible walls being supported in a substantially vertical position when the container is in use, a bottom for the container, a portion of said bottom being relatively stiff and connected to the flexible side wall throughout the length thereof, said stiff portion being hingedly connected to the remainder of the container bottom along a line spaced from and substantially parallel with the flexible side wall, a discharge opening along the hinge connection of the bottom, means for changing the relative pressure of the air in the container and that on the outer surface of the flexible wall to cause inward movement of the latter to raise said bottom portion, and means for preventing the bottom portion at the hinge connection from rising with the remainder of said portion, whereby fluid material in the container is directed to the discharge opening.

3. A transportation and storage hopper for fluid materials comprising a closed container to be supported at the top thereof and having flexible side and end walls, said flexible walls being supported in a substantially vertical position when the container is in use, a flexible bottom for the container connected to said walls, a discharge opening extending longitudinally of the bottom of the container centrally thereof, means for preventing the central longitudinal portion of the container bottom from rising, and means for changing the relative pressure of the air in the container and that on the outer surfaces of the flexible side walls to cause inward movement of the latter to raise the portions of the bottom on opposite sides of the discharge outlet, whereby fluid material in the container is directed to the discharge opening.

4. A transportation and storage hopper for fluid materials comprising a closed container to be supported at the top thereof and having flexible side and end walls, said flexible walls being supported in a substantially vertical position when the container is in use, a relatively stiff bottom portion connected to each side wall throughout the length thereof and extending inwardly to substantially the longitudinal centre of the container, a discharge opening extending along said longitudinal centre, means for preventing the central longitudinal portion of the container bottom from rising, said stiff bottom portions being swingable upwardly on each side of the discharge opening to slope towards the latter, and means for changing the relative pressure of the air in the container and that on the outer surfaces of the flexible side walls to cause inward movement of the latter to raise the portions of the bottom on opposite sides of the discharge outlet, whereby fluid material in the container is directed to the discharge opening.

5. A transportation and storage hopper for fluid materials comprising a flexible closed container having side and end walls, a top and a bottom, said container being supported at the top when in use, a side wall and at least a portion of the bottom connected thereto throughout its length being free to rise, a discharge suction tube inside the container and extending longitudinally of the bottom thereof, said tube communicating with the interior of the container substantially throughout the length thereof and opening out from the container, and means for preventing the bottom at the tube from rising, whereby suction equipment connected to the open end of the tube can reduce the interior pressure of the container and cause the container bottom to be lifted to direct fluid material therein to the suction tube.

6. A transportation and storage hopper for fluid materials comprising a flexible closed container having side and end walls, a top and a bottom, said container being supported at the top when in use, a discharge suction tube inside the container and extending longitudinally of the bottom thereof along a side wall, the bottom extending across the container from the tube and the side wall connected thereto being free to rise, and said tube communicating with the interior of the container substantially throughout the length thereof and opening out therefrom and means for preventing the bottom at the tube from rising, whereby suction equipment connected to the open end of the tube can reduce the interior pressure of the container to cause inward movement of the free side wall to raise the bottom connected thereto to direct fluid material in the container to the suction tube.

7. A transportation and storage hopper as claimed in claim 6 in which the portion of the bottom extending across from the suction tube to the flexible side wall is relatively stiff and hinged near the tube.

8. A transportation and storage hopper for fluid materials comprising a flexible closed container having side and end walls, a top and a bottom, said container being supported at the top when in use, a discharge suction tube inside the container and extending longitudinally of the bottom thereof substantially midway between its side walls, the portions of the bottom extending laterally from opposite sides of the tube and the side walls connected thereto being free to rise, and said tube communicating with the interior of the container substantially throughout the length thereof and opening out therefrom and means for preventing the bottom at the tube from rising, whereby suction equipment connected to the open end of the tube can reduce the interior pressure of the container to cause inward movement of the side walls to raise the bottom portions connected thereto to direct fluid material in the container to the suction tube.

9. A transportation and storage hopper as claimed in claim 8 in which the bottom portions extending from the tube to the flexible side walls are relatively stiff and hinged near the tube.

10. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge suction tube inside the container and extending longitudinally of the bottom thereof spaced from the flexible wall, said tube connecting with the interior of the container substantially throughout the length thereof and opening out therefrom at one of its ends, means for preventing the bottom at the tube from rising, and means for fluidizing any fluid material in the container.

11. A transportation and storage hopper as claimed in claim 10 in which the fluidizing means comprises at least one perforated tube on the bottom of the container and opening outwardly therefrom.

12. A transportation and storage hopper as claimed in claim 10 in which the fluidizing means comprises a plurality of spaced perforated tubes on the bottom of the container and opening outwardly therefrom.

13. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said bottom portion spaced from the flexible wall, means for preventing the bottom at the opening from rising, a pressure pocket overlapping the flexible wall, and means for admitting gas under pressure to the pocket.

14. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said bottom portion spaced from the flexible wall, means for preventing the bottom at the opening from rising, a pressure pocket overlapping the free portion of the bottom, and means for admitting gas under pressure to the pocket.

15. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said bottom portion spaced from the flexible wall, means for preventing the bottom at the opening from rising, pressure pockets overlapping both the flexible wall and the free portion of the bottom, and means for admitting gas under pressure to the pockets.

16. A transportation and storage hopper for fluid materials comprising a flexible closed container having side and end walls, a top and a bottom, said container being supported at the top when in use, a side wall and at least a portion of the bottom connected thereto throughout its length being free to rise, a discharge suction tube inside the container and extending longitudinally of the bottom thereof, said tube communicating with the interior of the container substantially throughout the length thereof and opening out from the container, means for preventing the bottom at the tube from rising, a pressure pocket overlapping said free wall, and means for admitting gas under pressure to the pocket.

17. A transportation and storage hopper for fluid materials, comprising a flexible closed container having side and end walls, a top and a bottom, said container being supported at the top when in use, a side wall and at least a portion of the bottom connected thereto throughout its length being free to rise, a discharge suction tube inside the container and extending longitudinally of the bottom thereof, said tube communicating with the interior of the container substantially throughout the length thereof and opening out from the container, means for preventing the bottom at the tube from rising, a pressure pocket overlapping the free portion of the bottom, and means for admitting gas under pressure to the pocket.

18. A transportation and storage hopper for fluid materials comprising a flexible closed container having side and end walls, a top and a bottom, said container being supported at the top when in use, a side wall and at least a portion of the bottom connected thereto throughout its length being free to rise, a discharge suction tube inside the container and extending longitudinally of the bottom thereof, said tube communicating with the interior of the container substantially throughout the length thereof and opening out from the container, means for preventing the bottom at the tube from rising, a pressure pocket overlapping both the free wall and the free portion of the bottom, and means for admitting gas under pressure to the pocket.

19. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said raisable bottom portion spaced from the flexible wall, means at the free portion of the bottom for tilting said portion from the flexible wall to the discharge opening and towards the latter, and means for preventing the bottom portion at the opening from rising with the remainder of said portion.

20. A transportation and storage hopper for fluid matrials comprising a flexible closed container having side and end walls, a top and a bottom, said container being supported at the top when in use, a side wall and at least a portion of the bottom connected thereto throughout its length being free to rise, a discharge suction tube inside the container and extending longitudinally of the bottom thereof, said tube communicating with the interior of the container substantially throughout the length thereof and opening out from the container, means at the free portion of the bottom for tilting said portion from the flexible wall to the discharge suction tube and towards the latter, and means for preventing the bottom portion at the tube from rising with the remainder of said portion.

21. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said bottom portion spaced from the flexible wall, a trough mounted beneath the discharge opening closing the latter, said trough having a discharge outlet therein, conveying means in the trough for moving material to the outlet, means at the free portion of the bottom for tilting said portion towards the discharge opening, and means for preventing the bottom portion at the opening from rising with the remainder of said portion.

22. A transportation and storage hopper for fluid materials comprising a flexible closed container having side and end walls, a top and a bottom, said container being supported at the top when in use, a side wall and at least a portion of the bottom connected thereto throughout its length being free to rise, a discharge opening along said bottom portion spaced from the flexible wall, a trough mounted beneath the discharge opening closing the latter, said trough having a discharge outlet at one end thereof, conveying means in the trough for moving material to the outlet, means at the free portion of the bottom for tilting said portion towards the discharge opening, and means for preventing the bottom portion at the opening from rising with the remainder of said portion.

23. A transportation and storage hopper for fluid materials comprising a closed container having a flexible side and a bottom at least a portion of which is free to be raised said flexible side being supported in a substantially vertical position when the container is in use, said portion of the bottom being connected to and extending inwardly from the flexible side along substantially the length thereof, a discharge opening along said bottom portion spaced from the flexible wall, means for preventing the bottom portion at the opening from rising, a trough mounted beneath the discharge opening closing the latter, said trough having a discharge outlet therein, conveying means in the trough for moving material to the outlet, a pressure pocket overlapping the flexible wall, and means for admitting gas under pressure to the pocket.

24. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said bottom portion spaced from the flexible wall, means for preventing the bottom portion at the opening from rising, a trough mounted beneath the discharge opening closing the latter, said trough having a discharge outlet therein, conveying means in the trough for moving material to the outlet, a pressure pocket overlapping the free portion of the bottom, and means for admitting gas under pressure to the pocket.

25. A transportation and storage hopper for fluid materials comprising a closed container having a flexible side and a bottom at least a portion of which is free to be raised, said flexible side being supported in a substantially vertical position when the container is in use, said portion of the bottom beting connected to and extending inwardly from the flexible side along substantially the length thereof, a discharge opening along said bottom portion spaced from the flexible wall, means for preventing the bottom portion at the opening from rising, a trough mounted beneath the discharge opening closing the latter, said trough having a discharge outlet therein, conveying means in the trough for moving material to the outlet, pressure pockets overlapping both the flexible wall and the free portion of the bottom, and means for admitting gas under pressure to the pockets.

26. A transportation and storage hopper for fluid materials comprising a closed ontainer having a flexible side and a bottom at least a portion of which is free to be raised, said flexible side being supported in a substantially vertical position when the container is in use, said portion of the bottom being relatively stiff and connected to and extending inwardly from the flexible side along substantially the length thereof, a discharge opening along said raisable bottom portion spaced from the flexible wall, said raisable bottom portion extending from the discharge opening to the flexible side so that it directs any material in the container to the discharge opening when it is raised along the edge thereof connected to the flexible side, and means for preventing the bottom portion at the opening from rising with the remainder of said portion.

27. A transportation and storage hopper for fluid materials comprising a closed container having a flexible side and a bottom at least a portion of which is free to be raised, said flexible side being supported in a substantially vertical position when the container is in use, said portion of the bottom being connected to and extending inwardly from the flexible side along substantially the length thereof, a discharge opening along said raisable bottom portion spaced from the flexible wall, means for raising the free portion of the bottom from the flexible wall to the discharge opening to tilt said portion towards the latter, and means for preventing the bottom portion at the opening from rising with the remainder of said portion.

References Cited in the file of this patent

UNITED STATES PATENTS

| | | |
|---|---|---|
| 2,105,160 | Piquerez | Jan. 11, 1938 |
| 2,109,549 | Piquerez | Mar. 1, 1938 |
| 2,145,613 | Shenk | Jan. 31, 1939 |
| 2,412,121 | Bradshaw | Dec. 3, 1946 |
| 2,564,163 | Leperre | Aug. 14, 1951 |
| 2,728,494 | Hobson | Dec. 27, 1955 |

FOREIGN PATENTS

| | | |
|---|---|---|
| 1,030,210 | France | Mar. 11, 1953 |